United States Patent
Grabelsky et al.

(10) Patent No.: US 6,937,610 B1
(45) Date of Patent: *Aug. 30, 2005

(54) METHOD AND PROTOCOL FOR A MEDIUM ACCESS CONTROL LAYER FOR LOCAL AREA NETWORKS WITH MULTIPLE-PRIORITY TRAFFIC

(75) Inventors: David Grabelsky, Skokie, IL (US); Ikhlaq Sidhu, Vernon Hills, IL (US)

(73) Assignee: 3Com Corporation, Marlborough, MA (US)

( * ) Notice: Subject to any disclaimer, the term of this patent is extended or adjusted under 35 U.S.C. 154(b) by 1006 days.

This patent is subject to a terminal disclaimer.

(21) Appl. No.: 09/680,910

(22) Filed: Oct. 6, 2000

Related U.S. Application Data (63) Continuation of application No. 09/003,844, filed on Jan. 7, 1998, now Pat. No. 6,169,744.

(51) Int. Cl.$^7$ ............................................. H04L 12/413
(52) U.S. Cl. ........................ 370/447; 370/445; 370/455; 370/462; 370/468; 370/469; 370/480; 370/230; 370/232
(58) Field of Search .......................... 370/431, 433, 370/455, 447, 462, 468, 469, 480, 489, 496, 370/229, 230, 232, 445

(56) References Cited

U.S. PATENT DOCUMENTS

| | | | |
|---|---|---|---|
| 4,667,323 A | 5/1987 | Engdahl et al. ............... 370/85 |
| 4,726,018 A * | 2/1988 | Bux et al. ................... 370/455 |
| 4,943,980 A | 7/1990 | Dobson et al. ............... 375/42 |
| 5,050,164 A * | 9/1991 | Chao et al. .................... 398/67 |
| 5,128,964 A | 7/1992 | Mallory ...................... 375/39 |
| 5,519,698 A | 5/1996 | Lyles et al. ................... 370/60 |
| 5,528,595 A | 6/1996 | Walsh et al. ............. 370/85.13 |
| 5,583,872 A | 12/1996 | Albrecht et al. ............ 370/476 |
| 5,615,212 A * | 3/1997 | Ruszczyk et al. ........... 370/433 |
| 5,657,326 A | 8/1997 | Burns et al. ................ 370/349 |
| 5,729,542 A * | 3/1998 | Dupont ....................... 370/346 |
| 5,886,993 A * | 3/1999 | Ruszczyk et al. ........... 370/451 |
| 6,064,650 A | 5/2000 | Kappler et al. ............. 370/232 |
| 6,141,336 A * | 10/2000 | Bauchot et al. ............. 370/348 |
| 6,169,744 B1 * | 1/2001 | Grabelsky et al. .......... 370/447 |

* cited by examiner

*Primary Examiner*—Wellington Chin
*Assistant Examiner*—Kevin Mew
(74) *Attorney, Agent, or Firm*—McDonnell Boehnen Hulbert & Berghoff LLP (57) ABSTRACT

A Medium Access Control ("MAC") Layer protocol and a method for contention resolution using the protocol is provided for networks with multiple priority traffic. The protocol is used where a physical layer connected to a transmission medium uses a carrier modulation scheme with multiple frequencies. Stations on the network that desire access to the transmission medium use a carrier modulation scheme with multiple frequencies. Stations that desire access simultaneously transmit a single frequency selected at random from a set of physical layer frequencies during an open-contention-interval. At the same time, the stations listen to a combined frequency signal and analyzes it for frequency content. The station whose own frequency matches the highest frequency signal in the combined signal gains access to a transmission medium. In the event of a collision, a restricted-contention-interval is used only for the colliding stations. The probability of successful contention resolution increases very rapidly using the restricted-contention-interval. By partitioning the set of frequencies in contiguous ranges, multiple priority classes can be used with the contention method and the MAC layer protocol.

15 Claims, 8 Drawing Sheets

METHOD AND PROTOCOL FOR A MEDIUM ACCESS CONTROL LAYER FOR LOCAL AREA NETWORKS WITH MULTIPLE-PRIORITY TRAFFIC

CROSS REFERENCES TO OTHER APPLICATIONS

This application is a Continuation of U.S. Application No. 09/003,844, filed on Jan. 7, 1998, now U.S. Pat No. 6,169,744.

FIELD OF INVENTION

The present invention relates to communications in computer networks. More specifically, it relates to a method and protocol for a Medium Access Control layer for computer networks with multiple priority traffic classes.

BACKGROUND OF THE INVENTION

Local Area Networks ("LAN") operate using a variety of data link layer protocols. As is known in the art, the Open Systems Interconnection ("OSI") model is used to describe computer networks. The OSI model consists of seven layers including, from lowest-to-highest, a physical, data link, network, transport, session, application and presentation layer. The physical layer transmits bits over a communication link. The data link layer establishes and maintains point-to-point connections for the transmission of data frames.

A widely used scheme for managing a LAN is Carrier Sense Multiple Access with Collision Detection ("CSMA/CD"). CSMA/CD is organized around layered protocols that include a data link layer with a Logical Link Control ("LLC") sub-layer and a Medium Access Control ("MAC") sub-layer. The LLC sub-layer handles logical links between stations while the MAC controls access to a transmission medium via a physical layer. A CSMA/CD standard for Ethernet LANs is defined by Institute of Electrical and Electronic Engineers ("IEEE") 802.3 standard.

The CSMA/CD structure is a peer-to-peer network structure and stations on the network are vying for use of a channel when they have data to transmit. The contention can result in collisions that distort the transmission signals. Distorted collision signals cannot be used by stations on the network. A "collision window" is typically used to handle CSMA/CD collisions.

A collision window describes the length of time required for a signal to propagate through the channel and to be detected by each station in the network.

Token bus LANs use a bus topology and provide access to a channel as if it were a ring. The token bus protocol is a collision-free protocol that uses a special frame called a "token" to govern which network station is allowed to send data. Capacity can be allocated through the use of priority classes. IEEE 802.4 defines a token bus LAN standard.

Token ring LANs connect participating stations in a ring topology; each station is connected to medium via a ring interface unit. The ring interface unit is responsible for monitoring data passing through it as well as regenerating a signal and passing it to the next station. Token ring LANs use a token to determine which station may transmit, and also include a priority scheme. The object of the priority scheme is to give each station an opportunity to reserve the use of the ring for the next transmission around the ring. IEEE 802.5 defines a token ring LAN standard.

The CSMA/CD Ethernet LANs, token bus LANs and token ring LANs and other 802.x standards use LLC and MAC in the data link layer. However, there are several problems associated with using CSMA/CD Ethernet LANs, token bus LANs and token ring LANs that use LLC and MAC in their data link layer.

CSMA/CD protocols with LLC and MAC work reasonably well with large numbers of stations, but do not easily or efficiently support multiple priority classes or priority schemes. Token bus and token ring protocols with LLC and MAC are typically more complex than CSMA/CD protocols. Token bus and ring related protocols with LLC and MAC in their data link layer can support multiple priority classes or priority schemes but have poor latency characteristics as the number of network stations grow.

It is desirable, especially in the area of real-time services (e.g., teleconferencing), to have a MAC layer protocol which is simple, efficient, fair and distributed that can be used on a variety of computer network types (e.g., CSMA/CD, token bus and token ring). The MAC layer protocol should allow for a large number of network stations with differing priority class levels and delay requirements.

SUMMARY OF THE INVENTION

In accordance with an illustrative embodiment of the present invention, the problems associated with MAC layer protocols are overcome. A method for contention resolution and a new MAC layer protocol is provided. The new MAC layer protocol is used in networks with physical layers that employ frequency modulation schemes. Frequency domain information from the physical layer is used to quickly resolve contention during a very short interval that precedes all transmissions.

The new MAC layer protocol is based on three principals: 1) contention is definitively resolved before data transmission proceeds; 2) use of the frequency domain of a physical layer allows all contending stations to simultaneously broadcast their intent to transmit; and 3) partitioning of the utilized frequency bandwidth provides a simple process for introducing new priority levels into the contention resolution process.

The new MAC layer protocol includes: (1) a dead-time-silence-interval, which is used to begin an open-contention-interval; (2) an open-contention-interval, to allow all stations with data to transmit to contend for a access to the physical medium; (3) an intent-to-transmit-signal, which is a single signal frequency from a set of frequencies available on a selected physical layer; (4) combined-contention-signal, which is a simultaneous superposition of multiple intent-to-transmit-signal frequencies and is used to resolve contentions; (5) a restricted-contention-interval, which is used only for stations colliding in a previous contention-open-interval; and (6) a restricted-contention-delay-interval, which is used to begin a restricted-contention-interval and is shorter than a dead-time-silence-interval. The intent-to-transmit-signal can also be used with a set of partitions created from the set of frequencies available on the selected physical layer. The set of partitions allows use of multiple priority classes among contending stations. However, more or fewer protocol elements could also be used in the new MAC layer protocol.

The method includes broadcasting a first signal called an intent-to-transmit-signal from a first station to all stations active in the network during an open-contention-interval. The first signal is a frequency signal selected independently and at random from a predetermined set of frequencies used by a physical layer in the network. A second signal called a combined-contention-signal is received from active stations on the network. The first and second signals are temporally coincident (i.e., simultaneous). The second signal is decoded by each station and the randomly selected frequencies present in the combined signal are determined. A station determines that it has gained access to the transmission medium based on a comparsion of the frequencies present in the combined-contention-signal with its own selected frequency. A station that gains access is allowed to transmit data until the transmission is complete, without interference from other network stations. If two of more stations determine that they have gained access to the transmission medium, then a collision will occur. In this case, a restricted contention interval will be used to resolve contention only between the colliding stations. This process is identical to the open contention process except that only colliding stations may participate, and restricted contention is preceeded by a restricted-contention-only interval.

The method and new MAC layer protocol provides fast contention resolution for a large number of network stations with differing priority class levels and delay requirements. The method and new MAC layer protocol is simple, efficient and can be used on a variety of computer networks that use wideband modulation in the physical layer.

The foregoing and other features and advantages of an illustrative embodiment of the present invention will be more readily apparent from the following detailed description, which proceeds with references to the accompanying drawings.

DETAILED DESCRIPTION OF AN ILLUSTRATIVE EMBODIMENT

Figure 1:
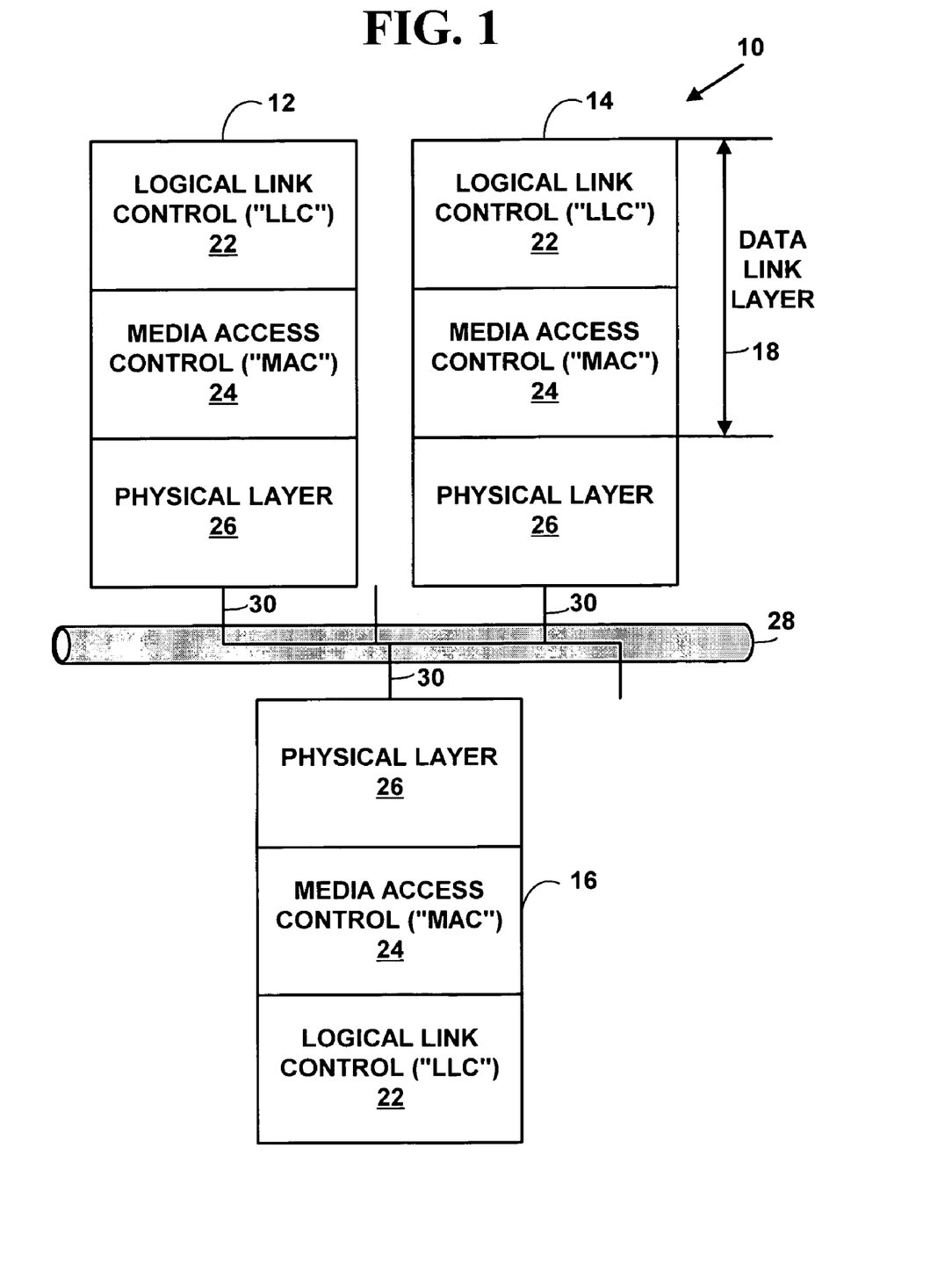
FIG. 1 is a block diagram of a network system used to implement an illustrative embodiment of the present invention.

FIG. 1 is a block diagram of a network system 10 used to implement an illustrative embodiment of the present invention. Network system 10 is illustrated as a LAN but may also include other types of networks (e.g., an intranet). As is known in the art, the Open System Interconnection ("OSI") model is used to describe computer networks. The OSI model consists of seven layers including from lowest-to-highest, a physical, data link, network, transport, session, application and presentation layer. The physical layer transmits bits over a communication link. The data link layer establishes and maintains point-to-point communications for the transmission of data frames.

Network system 10 includes multiple network stations 12,14 and 16. Only three network stations are illustrated in FIG. 1. However, the invention is not limited to a network with three network stations and more or fewer network stations can also be used. Network stations (12,14,16) have a data link layer 18 and other higher layers (e.g., network layer, etc.) not shown in FIG. 1. Data link layer 18 includes a Logical Link Control ("LLC") sub-layer 22 and a Medium Access Control ("MAC") sub-layer 24. A physical layer 26 is included below data link layer 18. Physical layer 26 is connected to a transmission medium 28 with a connector 30. Network system 10 may be any of CSMA/CD Ethernet LAN, Token bus LAN, Token ring LAN, or others. CSMA/CD Ethernet LANs are defined in the IEEE 802.3 standard, Token bus LANs are defined in the IEEE 802.4 standard and Token ring LANs are defined in IEEE 802.5. However, network system 10 can also include another one of the IEEE 802.x standards or other network protocol standards (e.g., ISO, ITU-T).

An operating environment for the network stations of the present invention includes a processing system with at least one high speed Central Processing Unit (CPU). In accordance with the practices of persons skilled in the art of computer programming, the present invention is described below with reference to acts and symbolic representations of operations that are performed by the processing system, unless indicated otherwise. Such acts and operations are referred to as being computer-executed.

It will be appreciated that the acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, and any other volatile or non-volatile mass storage system readable by the computer. The computer readable medium includes cooperating or interconnected computer readable medium, which exist exclusively on the processing system or be distributed among multiple interconnected processing systems that may be local or remote to the processing system.

New MAC Layer Protocol Description

Figure 2:
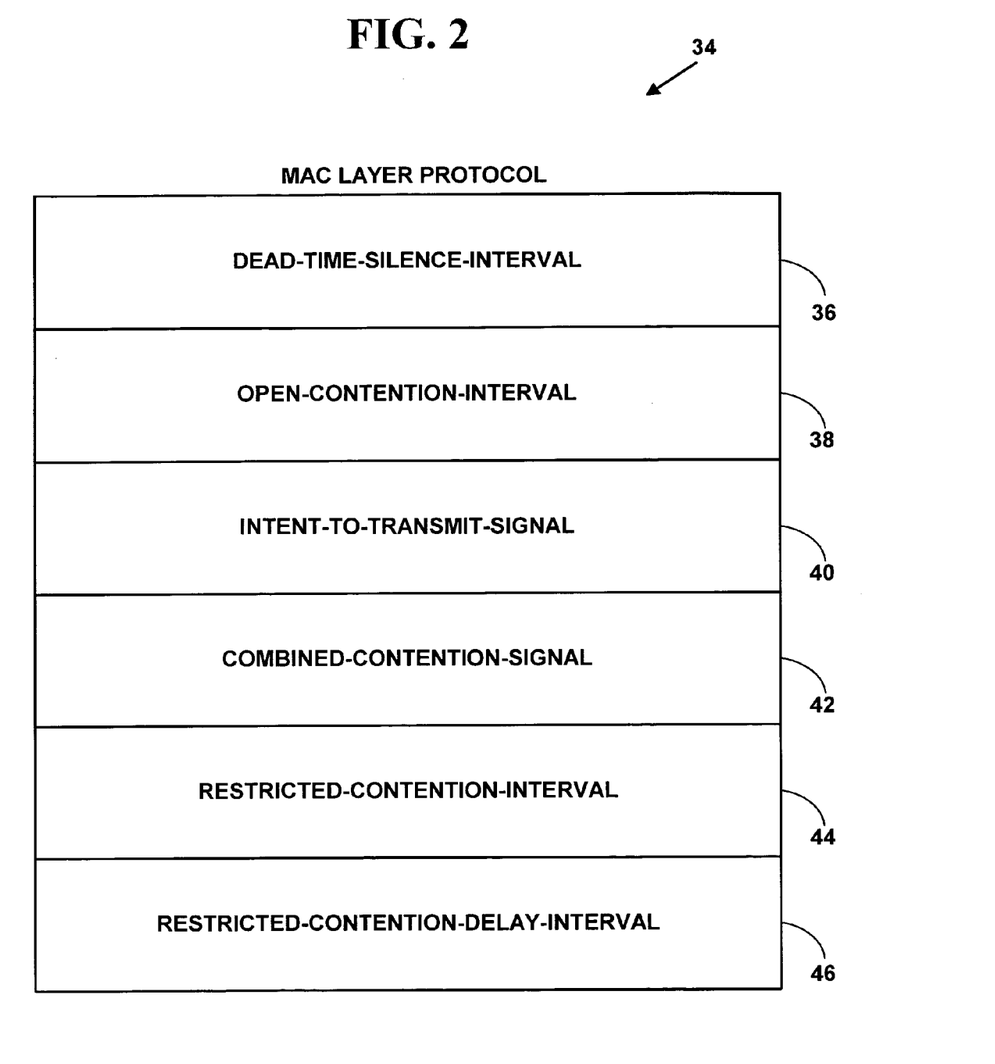
FIG. 2 is a block diagram illustrating a new MAC layer protocol.

FIG. 2 is a block diagram illustrating a new MAC layer protocol 34. MAC layer protocol 34 is used in networks with physical layers that employ frequency modulation schemes which include multiple discrete frequencies. Frequency domain information from the physical layer is used to quickly resolve contention during a very short interval that precedes all transmissions.

MAC layer protocol 34 includes: (1) a dead-time-silence-interval 36, which is used to begin an open-contention-interval; (2) an open-contention-interval 38, to allow any station to contend to gain control of a selected physical layer; (3) an intent-to-transmit-signal 40, which is a single signal frequency randomly selected from a set of frequencies available on a selected physical layer; (4) combined-contention-signal 42, which is a superposition of multiple intent-to-transmit-signal frequencies and is used to resolve contentions; (5) a restricted-contention-interval 44, which is used to allow only those stations colliding in a previous contention interval to contend to gain control of the selected physical layer; and (6) a restricted-contention-delay-interval 46, which is used to begin a restricted-contention-interval and is shorter than a dead-time-silence-interval 36. Intent-to-transmit-signal 40 can also be used with a set of partitions created from the set of frequencies available on the selected physical layer. The set of partitions allows use of multiple priority classes among contending stations. However, more or fewer elements could also be used in new MAC layer protocol 34.

MAC Layer Protocol Contention Resolution

Figure 3:
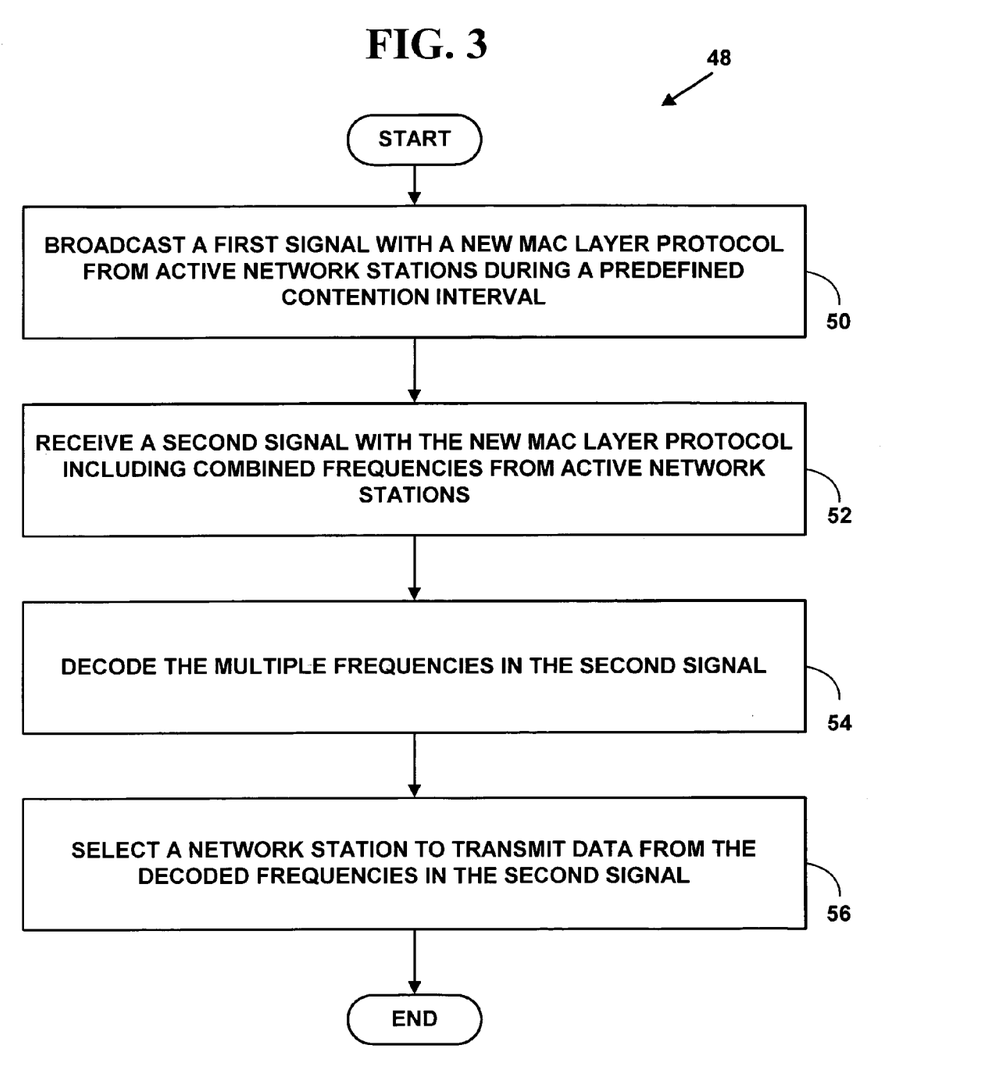
FIG. 3 is a flow diagram illustrating a method for contention resolution using the new MAC layer protocol.

FIG. 3 is a flow diagram illustrating a method 48 for resolving contentions with new MAC layer protocol 34. The method includes broadcasting a first MAC layer protocol signal in network system 10 with MAC layer protocol 34 from active stations desiring to transmit data during a predefined contention interval at step 50. The first signal frequency is a single signal frequency selected at random from a predetermined set of frequencies used by a physical layer in the network. Each station participating in the protocol makes its frequency selection independently of all other stations. A second signal is received on the network stations with MAC layer protocol 34 at step 52. The second signal is a simultaneous superposition of the signals broadcast by the active stations on the network during the contention interval. The second signal is decoded and the frequencies present are determined at step 54. At step 56 a station determines based on the decoded frequencies and a comparison of the decoded frequencies with the frequency transmitted in the first signal if the station can transmit data. If a station has determined it can transmit data, the station is allowed to transmit data until its transmission is complete without interference from any of the other network stations.

Figure 4A:
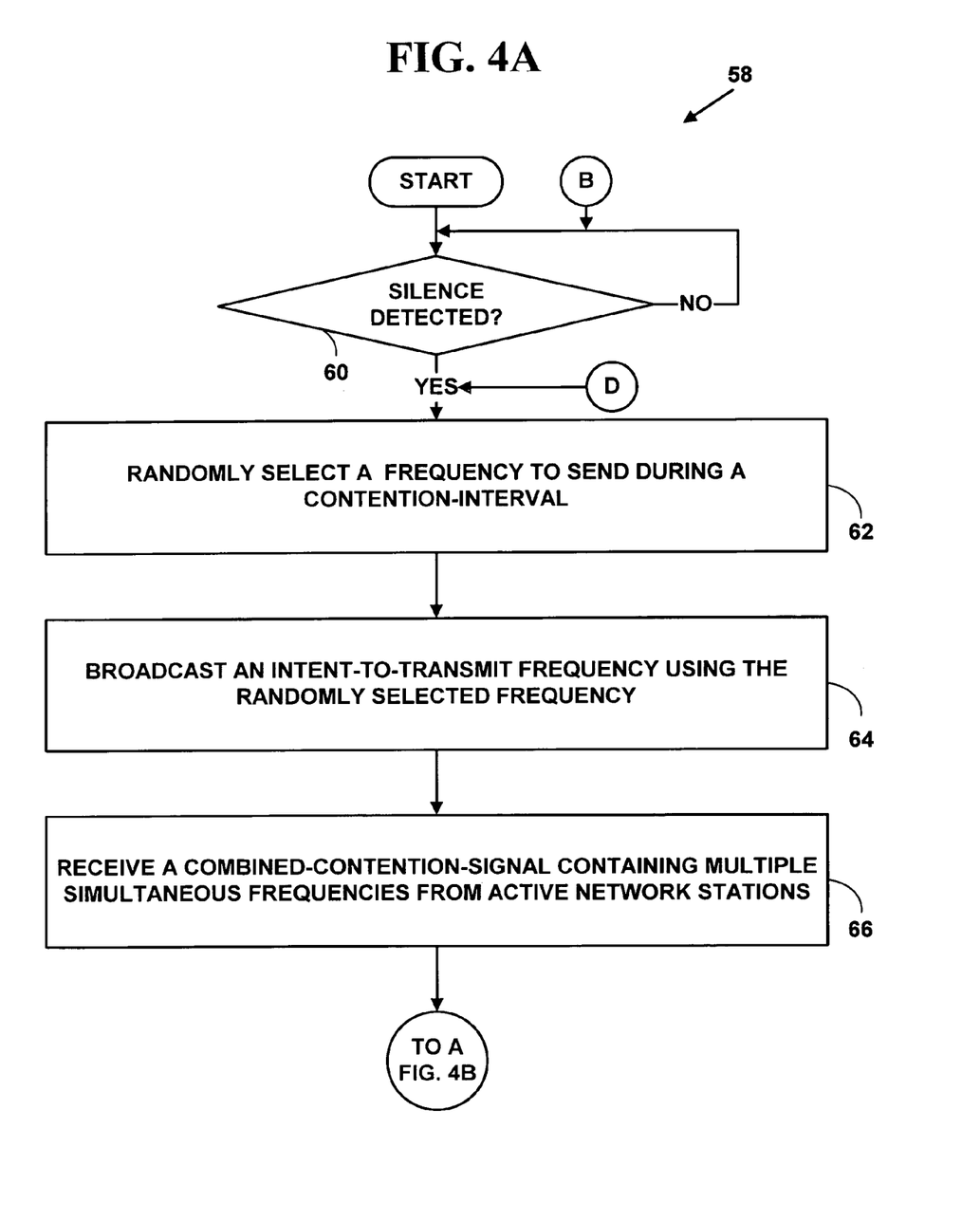
FIGS. 4A, 4B and 4C are a flow diagram illustrating a method for contention resolution using the new MAC layer protocol.
Figure 4B:
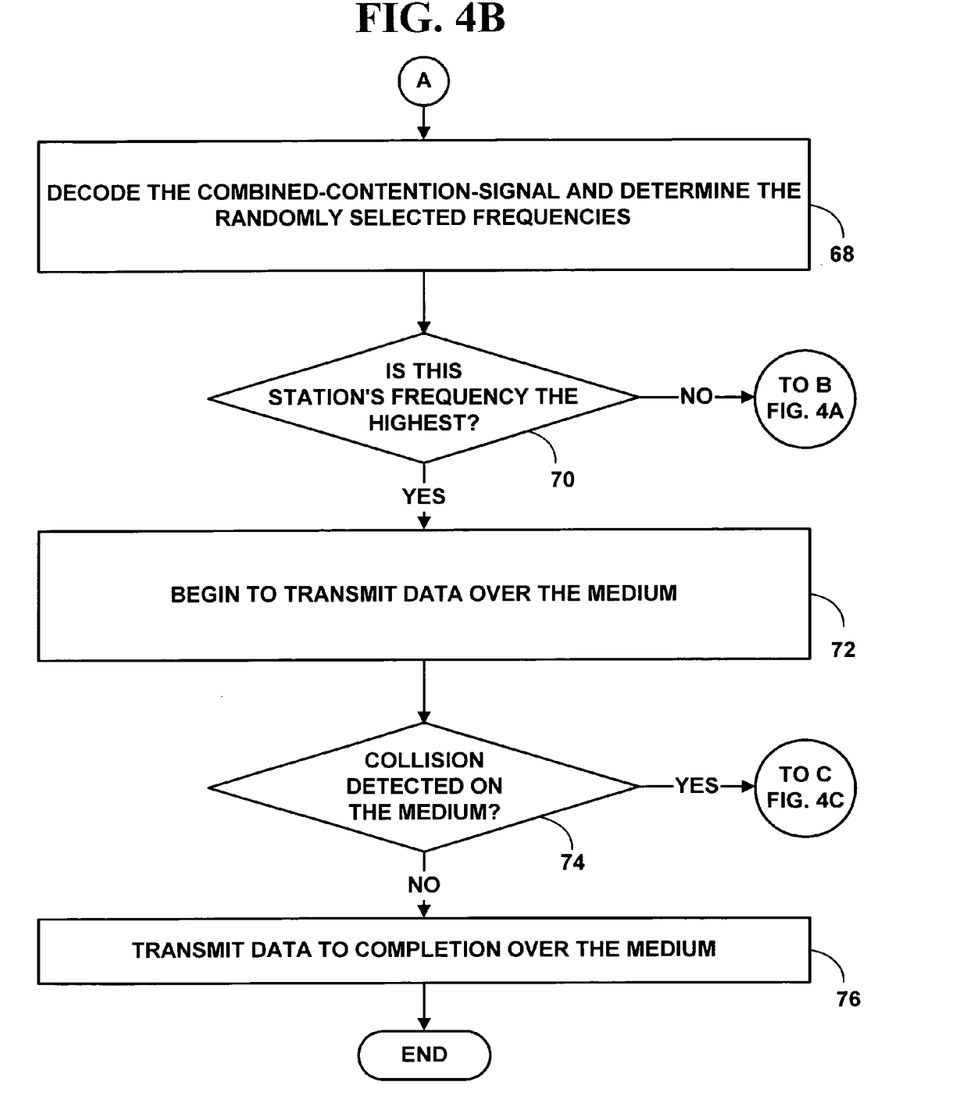
Figure 4C:
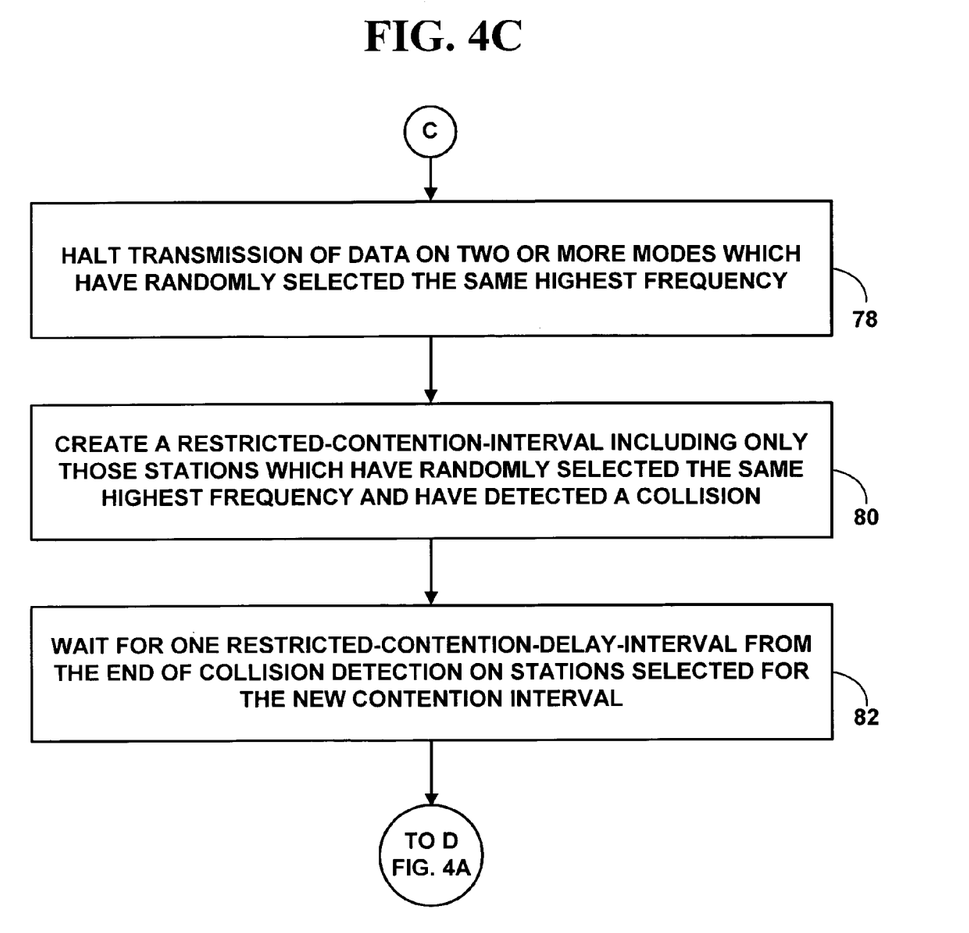

FIGS. 4A, 4B and 4C are a flow diagram illustrating a method 58 for contention resolution using MAC layer protocol 34. When a station desires to transmit data it has received from a layer above data link layer 18, it must first monitor transmission medium 28 for silence of a duration equal to, or greater than on dead-time-silence interval 36. A test is conducted for silence at step 60 in FIG. 4A. Silence could be detected immediately if no transmission is in progress, or may require waiting until an already in-progress transmission is complete. In either case, if silence is detected for dead-time-silence-interval 36 (e.g., 0.5 milli-seconds), an open-contention-interval 38 begins. During open-contention-interval 38, stations which desire to transmit data and have detected silence for at least one dead-time-silence-interval 36 select a frequency at random from a predetermined set of frequencies for physical layer 26 at step 62. The frequency is a single signal frequency selected at random from a fixed set of available frequencies and each station makes its selection independently of all other stations. A specific physical layer 26 may have reserved frequencies that are not usable for method 58, and in such a scenario, the reserved frequencies would not be available for selection by a station. Selecting frequencies for physical layer 26 is explained below.

Each contending station (12,14,16) makes an independent frequency selection. However, two or more stations may, by chance, randomly choose the same signal frequency, possibly resulting in a later collision, as is explained below. The fixed set of available frequencies is specific to an implementation of the invention. The fixed set of available frequencies may be partitioned, such that each partition represents a different priority level for access to transmission medium 28. With a partitioned set of usable frequencies, each partition is a subset of the fixed set of usable frequencies. Priority levels are explained below.

Returning to FIG. 4A, the stations broadcast intent-to-transmit-signal 40 with their selected frequencies at step 64. The stations broadcast a signal (i.e., a tone) at its chosen frequency for the duration of open-contention-interval 38. At step 66, each station receives a combined-contention-signal 42. Combined-contention-signal 42 contains multiple frequency signals, one from each of the contending nodes. Combined-contention-signal 42 is a simultaneous superposition of all the signals broadcast by the stations, and is detected by each station during the same time interval in which each station broadcasts its intent-to-transmit signal 40.

At step 68 in FIG. 4B, combined-contention-signal 42 is decoded in the network stations. In an illustrative embodiment of the present invention, decoding is accomplished by applying a Fast Fourier Transform ("FFT") to combined-contention-signal 42, then determining whether power measured in frequency bins of a resultant time-to-frequency transformed frequency signal exceeds some predetermined threshold. However, the present invention is not limited to FFTs and other decoding techniques could also be used. For more information on FFTs, see "Numerical Recipes in C: The Art Of Scientific Computing," by William H. Press, Saul A. Teukolsky, William T. Vetterling, Cambridge University Press, Cambridge, Mass., 1993.

At step 70, a test is conducted by each station to determine if a station's frequency signal is the highest frequency signal in combined-contention-signal 42. If so, at step 72, the station with the highest frequency signal immediately begins to transmit data on transmission medium 28. If the station's frequency signal is not the highest frequency signal in combined-contention-signal 42, the station is prohibited from transmitting data and must wait again for a dead-time-silence-interval 36 at step 60 in FIG. 4A. A station that does not have the highest frequency may not contend again until the start of the next open-contention-interval 38.

If the same highest frequency signal in combined-contention-signal 42 has been selected by two or more stations, each will begin to transmit data on transmission medium 28 at step 72 and a collision will result. A test is conducted by each transmitting station at step 74 to determine if a collision has been detected on transmission medium 28. If not, the station transmits data until completion at step 76.

If two or more stations transmitting data detect a collision, they halt data transmission at step 78 in FIG. 4C. A new contention interval that includes only the two or more colliding nodes from the previous contention-interval is started at step 80. The new contention interval is restricted-contention-interval 44 and signifies that only colliding stations from a previous contention interval may try again to transmit data (i.e., stations that selected the same contention-signal frequency). The two or more stations that will participate in the new restricted-contention-interval 44 must wait for one restricted-contention-delay-interval 46 from the end of the collision detection at step 82. The restricted-contention-delay-interval 46 is measurably shorter than dead-time-silence-interval 36 described above (e.g., <0.5 milli-seconds). This ensures that silence on medium 28 preceding a restricted-contention-interval 44 (i.e., step 82) cannot be confused with the silence that precedes an open-contention-interval 38 (i.e., step 60). Only the appropriate stations (i.e., the stations that have selected the same highest frequency) participate in the restricted-contention-interval. Steps 62–82 are repeated until only one station selects a highest frequency signal and the contention is resolved. Once contention is resolved, undisturbed data transmission is guaranteed.

The probability of successful resolution during any single open-contention-interval 38 increases inversely with the ratio of the number of contending stations to the number of available frequencies as is illustrated in Equation 1.

$$P = \frac{N}{V^N} \sum_{k=1}^{v} (k-1)^{N-1} \quad (1)$$

Equation 1 gives a probability P that on a single try, only one of N stations chooses the highest frequency value from among V consecutive frequency numbers. The probability of successful resolution is statistically significant even when the ratio is greater than one. By restricting any new restricted-contention-intervals 44 to only those stations that collided in the previous open-contention-interval 38, an expected number of intervals needed to achieve contention resolution falls off more quickly than a geometric distribution, which would be the case if this restriction is not enforced. Contention resolution is typically very rapid, usually within one to three attempts, even when the initial number of contending stations exceeds the number of available frequencies by a factor of four or more. For example, it has been determined experimentally with 300 possible stations and only 20 available frequencies, that contention between stations is resolved in three or fewer tries using method 58. Once contention is resolved, undisturbed data transmission is guaranteed.

MAC Layer Protocol Frequency Domain Processing

In one embodiment of the present invention, new MAC layer protocol 34 is intended for use in network systems where physical layer 26 uses a frequency modulation scheme that incorporates, discrete frequencies (e.g., Quadrature Amplitude Modulation ("QAM") frequencies). However, other network systems could also be used.

The set of frequencies used by physical layer 26 is the same set used to resolve contention between stations. Combined-contention-signal 42 is just the simultaneous superposition of frequencies selected by contending stations during an open-contention-interval 38 or restricted-contention-interval 44. The transmission and detection processes already in place for physical layer 26 are used in new MAC layer protocol 34 both to transmit intent-to-transmit-signals 40 from each contending station, and to detect the resulting combined-contention-signals 42.

Frequency processing includes analyzing combined-contention-signal 42 in order to determine which frequencies are present. Each contending station compares the frequency of its own intent-to-transmit-signal 40 with the highest frequency detected in the combined-contention-signal 42 (step 70, FIG. 4B). If its own frequency is the highest, then the station may transmit (step 72, FIG. 4B). Otherwise, the station waits for one dead time of silence (step 60, FIG. 4A) following the end of the transmission of the station that gained access to transmission medium 28.

The actual detection and analysis, and the number of possible frequencies depend upon the specific physical layer used. If FFTs are used, the frequencies are chosen to be the Fourier frequencies corresponding to a sampling rate $f_s$. In this scenario, the highest available frequency would be $f_s/2$, and the sampling interval would be $T_s=1/f_s$. If the number of samples per detection cycle is N, then there are N/2 distinct Fourier frequencies from $f_s/N$ to $f_s/2$ inclusive. The detection cycle then has a duration $N \times T_s$, which is the minimum length of open-contention-interval 38. For example, with 128 samples and $T_s=4$ micro-seconds, the detection cycle would be about 0.5 milliseconds. This would accommodate 64 frequencies, evenly spaced from roughly 2 kHz to 125 kHz.

A random number interval to assign a frequency would include the numbers 1 to 64 for selecting all of the 64 frequencies in this interval. The actual number of frequencies that can be supported is a tradeoff between the desired length of the contention interval, the maximum sampling rate, and the signal-to-noise ratio of the transmission medium. However, the present invention is not limited to FFTs and other detection and analysis techniques could also be used for the MAC layer protocol 34.

MAC Layer Protocol Multiple Priorities

Figure 5:
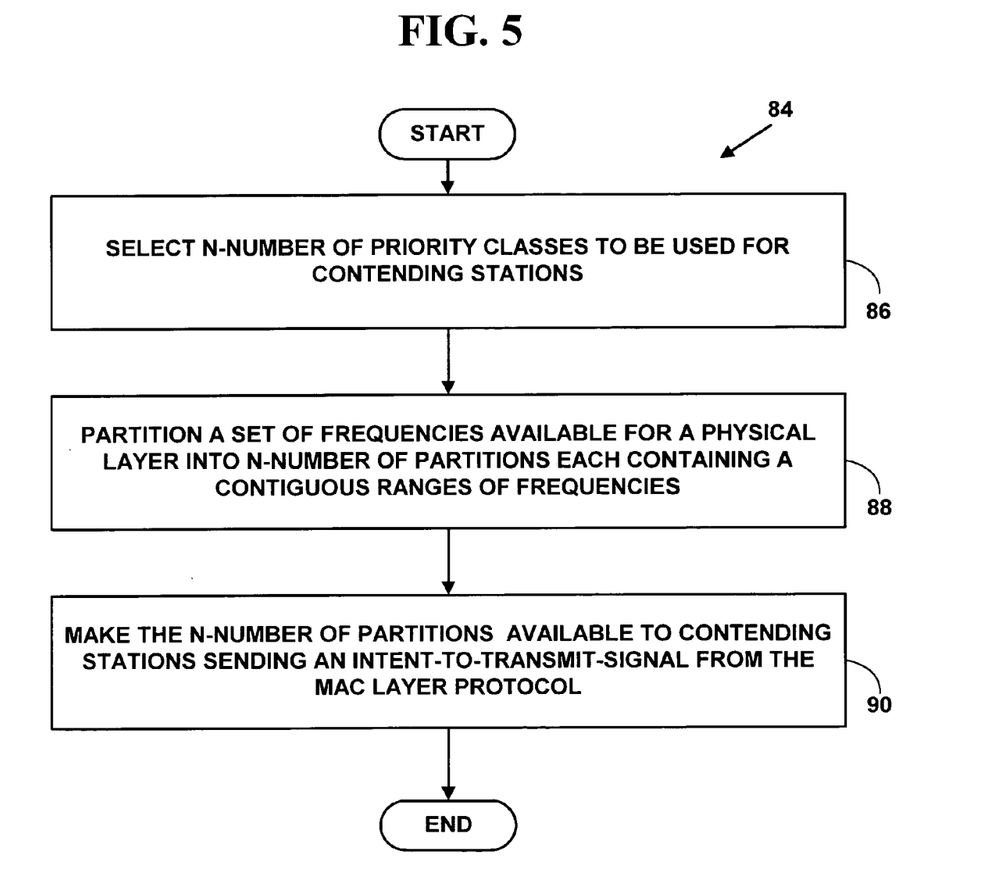
FIG. 5 is a flow diagram illustrating a method for creating multiple priorities in the new MAC layer protocol.

Multiple priority classes among the contending stations is accomplished by partitioning a set of frequencies available for physical layer 26. FIG. 5 is a flow diagram illustrating a method 84 for creating multiple priorities with MAC layer protocol 34. At step 86, N-number of priority classes to be used are selected. At step 88, the set of frequencies available for physical layer 26 is partitioned into N-number of partitions each containing a contiguous range of frequencies. At step 90, the N-number of partitions are provided to stations (12,14,16) for use in intent-to-transmit-signal 40.

The number of priority classes must not exceed the number of available frequencies, and each priority class must include at least two frequencies. Except for these restrictions, each priority class is not required to include the same number of frequencies.

Each partition contains a contiguous range of frequencies from the set of frequencies, and the concatenation of all partitions gives the complete set. The number of priority classes corresponds directly to the number of partitions. During any given contention interval, contending stations will make their frequency selection from an assigned partition. Access to transmission medium 28 is guaranteed to be granted only to one of the contending stations from the partition with the highest frequency during that particular contention interval. The mix of priority classes during each open-contention-interval 38 does not necessarily represent one frequency from each of the total number of partitions, but one priority class is guaranteed to be the highest frequency of those that are present.

Multiple priorities are obtained by modifying step 62 of method 58. The available frequencies are restricted to a partition that correspond to priority classes for a selected transceiver. Other aspects of the protocol and method remained unchanged.

System Architecture for Using MAC Layer Protocol

Figure 6:
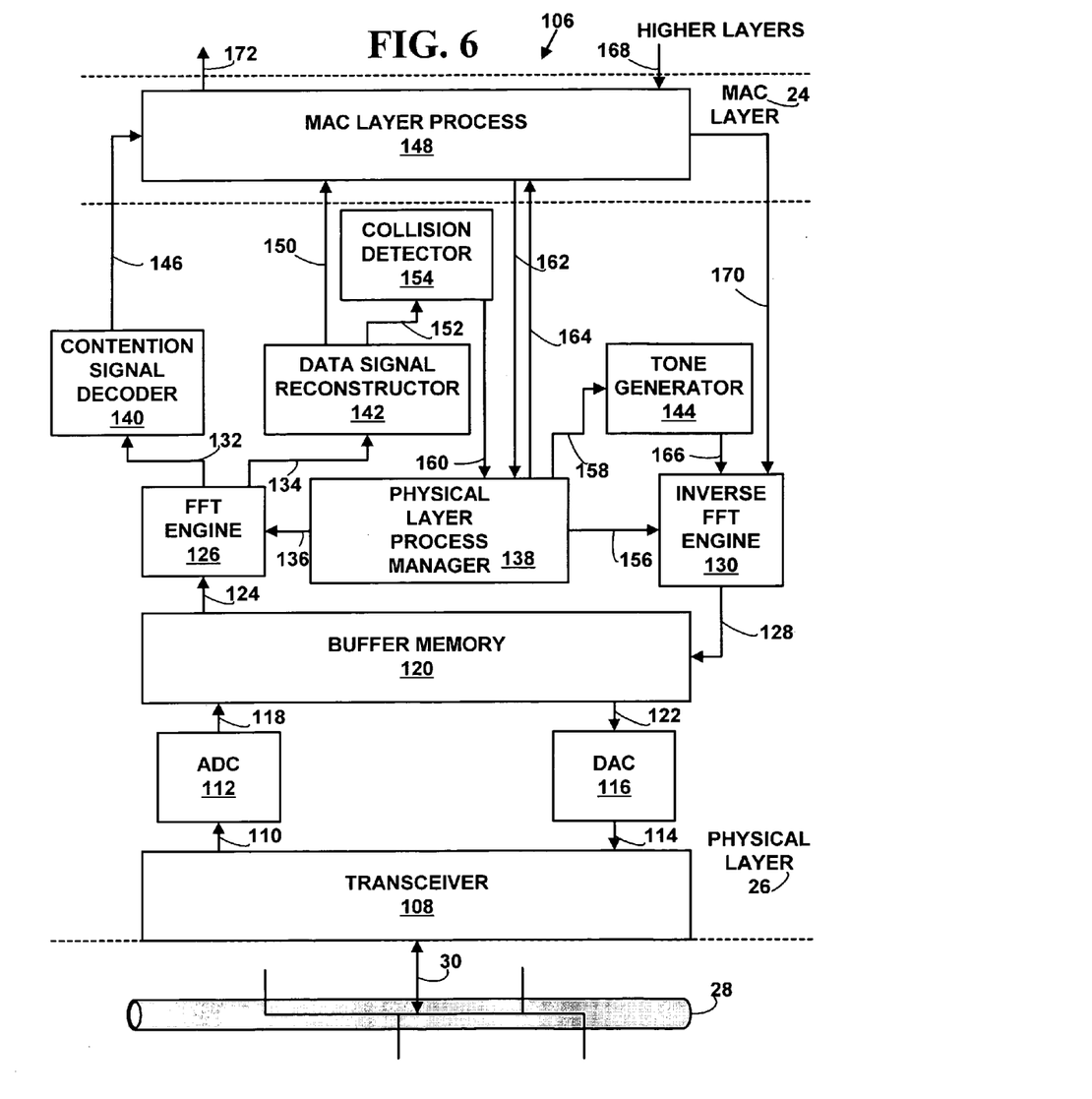
FIG. 6 is a block diagram illustrating system architecture for an illustrative embodiment of the present invention.

FIG. 6 is a block diagram illustrating a system architecture 106 for using new MAC layer protocol 34 and one or more of methods 48, 58, and 84. Transmission medium 28 is a shared physical transmission medium (e.g., a coaxial cable). Connection 30 connects shared transmission medium 28 to a transceiver 108. Connection 30 is a data path for both input data from shared transmission medium 28 and output data to shared transmission medium 28. This is a physical connection between shared transmission medium 28 and a transceiver 108. In another embodiment of the present invention, connection 30 is two distinct physical connections, one for each direction.

Transceiver 108 is hardware that transmits and receives data to/from shared transmission medium 28. In another embodiment of the present invention transmit and receive functions may be carried out by two distinct hardware components, one for each direction.

Connection 110 connects transceiver 108 to an Analog-to-Digital Converter ("ADC") 112. ADC 112 converts analog input signals into digital data. Connection 114 connects transceiver 108 to a Digital-to-Analog Converter ("DAC") 116. Connection 118 connects ADC 112 to a buffer memory 120. Buffer memory 120 is used to stored data being processed for either input or output. Connection 122 connects buffer memory 120 to DAC 116.

Connection 124 connects buffer memory 120 to an FFT engine 126 and passes data from buffer memory 120. FFT engine 126 transforms time domain signals to the frequency domain. Connection 128 connects an inverse FFT engine 130 to buffer memory 120. Inverse FFT engine 130 transforms frequency based signals to the time domain.

Digitized output of ADC 112 stored in buffer memory 120 represents a time series signal (i.e., a sequence of numbers indexed by time-of-arrival at transceiver 108). Such a time series has a corresponding representation in frequencies given by a series of numbers indexed by frequency value. The conversion of the time series representation to the frequency representation is carried out by FFT engine 126. Output of FFT engine 126 is passed along either connection 132 or connection 134 depending upon a control signal passed via connection 136 supplied by a physical layer process manager 138.

If the station is participating in contention resolution, the output of FFT engine 126 is passed to a contention signal decoder 140 over connection 132. This determination is made according to a control signal via connection 136 supplied by physical process manager 138.

If the station is receiving data, the output of FFT engine 126 is passed to a data signal reconstructor 142 over connection 134 since the data corresponds to an actual data transmission (i.e., the transmission that follows contention resolution). This determination is made according to control input signal 136 supplied by physical process manager 138.

Contention signal decoder 140 compares a frequency content of a signal with a frequency content of a intent-to-transmit-signal 40 that was generated by a tone generator 144. The output of contention signal decoder 140 is a logical determination of whether or not the station's frequency was the highest frequency in a combined-contention-signal 42. The output of contention signal decoder 140 is passed along connection 146 to a MAC layer process 148 in MAC sub-layer 24. All of the components described above except MAC layer process 148 are in physical layer 26. MAC layer process 148 is in a MAC sub-layer 24 of data link layer 18. The divisions between the various layers are indicated with the dashed lines in FIG. 6.

Data signal reconstructor 142 processes input frequency domain data and generates bits and bytes of digital data sent by transmitting the station. If the station executing data signal reconstructor 142 is not the transmitting station, the data is passed via connection 150 to MAC layer process 148 in MAC sub-layer 24. If the station is the transmitting station, then the output of this block is passed along connection 152 to a collision detector 154.

Physical layer process manager 138 is a control process that maintains states of physical layer 26. The various physical layer states are maintained as follows:

1. Inform FFT engine 126 whether it is processing an actual data transmission signal or a contention signal. It communicates via connection 136.
2. Inform inverse FFT engine 130 whether it is processing an actual data transmission signal or a contention signal. It communicates via connection 156.
3. Inform tone generator 144 to generate a tone via connection 158.
4. Receive results from collision detector 154 via connection 160.
5. Receive control signals from MAC layer process 148 via connection 162.
6. Send control signals to MAC layer process 148 via connection 164.

However, more or fewer physical layer states could also be used and maintained.

Collision detector 154 is used only for the transmitting station. Collision detector 154 compares the reconstructed signal from data reconstructor 142 with the known transmitted signal. The comparison is used to determine if a collision has occurred. The result of the comparison is supplied to physical layer process manager 138 via connection 160. If a collision has occurred, physical layer process manager 138 signals MAC layer process 148 via control output connection 164. MAC layer process 148 will request the in-progress transmission be halted, and return the request to physical layer process manager 138 via control input connection 162.

Tone generator 144 provides the appropriate input to inverse FFT engine 130 to generate a single-frequency tone. The required input is supplied along connection 166.

MAC layer process 148 implements MAC layer protocol 34. Data supplied by higher layers (e.g., LLC 22) are passed via connection 168 to inverse FFT engine 130 via connection 170. Data received in MAC layer process 148 from shared transmission medium 28 via physical layer 26 are passed to higher layers via connection 172.

Control signals passed from MAC layer process 148 to physical layer process manager 138 via connection 162 include the following:
1. Ready for contention.
2. Start silence timer.
3. Intent to transmit frequency values.
4. Transmit data.
5. Halt transmission.

However, more or fewer control signals could also be used.

Control signals passed to MAC layer process 148 from physical layer process manager 138 via connection 164 include the following:
1. Silence timer expired.
2. Collision detected.
3. Transmission complete.

However, more or fewer control signals can also be used. In addition, the result of a frequency comparison completed by contention signal decoder 140 is passed to MAC layer process 148 via connection 146 to determine whether or not the station has gained access to shared medium 28.

The present invention is not limited to architecture 106 and more or fewer components could also be used. In addition, new MAC layer protocol 34 and one or more of methods 48, 58, 84 could also be implemented in the systems described in U.S. Pat. No. 4,943,980 to Dobson et al. entitled "Multi-carrier high speed modem" or in U.S. Pat. No. 5,128,964 to Mallory entitled "Modulation method and apparatus for multi-carrier data transmission."

In an illustrative embodiment of the present invention, MAC layer protocol 34 is simple, efficient and can be used on a variety of computer network types. MAC layer protocol 34 and one or more of methods 48, 58, or 84 allow for fast contention resolution for a large number of network stations with differing priority class levels and delay requirements.

It should be understood that the programs, processes, methods and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a network system with a plurality of stations, the plurality of stations having a medium access control layer above a physical layer, a method of providing multiple priority classes with a medium-access-control-layer protocol connecting the stations to a transmission medium, the method comprising the following steps:

selecting on a first station a signal frequency for a desired priority class from N-number of priority classes to be used for contending stations, wherein the N-number of priority classes are created by partitioning a set of signal frequencies available for the physical layer into M-number of partitions, wherein each partition includes a contiguous range of signal frequencies from the set of signal frequencies and each frequency in the contiguous range of signal frequencies represents a priority class;

broadcasting the selected signal frequency for the desired priority class in an intent-to-transmit-signal with a medium-access-control-layer protocol from the first station to other stations on the network during a medium access control protocol open-contention-interval;

receiving on the first station with the medium access control protocol a combined-contention-signal including a plurality of priority class intent-to-transmit-signals, wherein the combined contention signal is a superposition of a plurality of priority class intent-to-transmit-signals from others stations in the network system;

decoding a plurality of priority class intent-to-transmit-signal frequencies from the combined-contention-signal;

determining whether the first station has selected the highest signal frequency for the desired priority class from the plurality of priority class signal frequencies in the combined-contention-signal, and if so, transmitting data from the first station to the transmission medium as data for the desired priority class.

2. A computer readable medium having stored therein instructions for a causing a central processing unit on a station to execute the method of claim 1.

3. The method of claim 1 wherein the transmission medium is a coaxial cable.

4. The method of claim 1 further comprising:

determining whether the first station has selected the highest signal frequency for the desired priority class from the plurality of priority class signal frequencies in the combined-contention-signal, and if not, waiting for a next medium access control protocol open-contention-interval before sending the selected signal frequency during the next medium-access-control-layer protocol open-contention-interval.

5. The method of claim 1 wherein each priority class includes at least two signal frequencies.

6. The method of claim 1 wherein a wherein a mix of priority classes during the open-contention interval represents at least one signal frequency from each of the priority classes.

7. The method of claim 1 wherein a mix of priority classes during the open-contention interval does not represent a signal frequency from each of the priority classes.

8. The method of claim 1 wherein the N-number of priority classes each include an equal number of signal frequencies.

9. The method of claim 1 wherein selected ones of the N-number of priority classes include X-number of signal frequencies and other selected ones of the N-number of priority classes include Y-number of signal frequencies, wherein X is not equal to Y.

10. The method of claim 1 wherein the N-number of priority classes is equal to the M-number of partitions.

11. The method of claim 1 wherein the step of determining whether the first station has selected the highest priority class signal frequency from the plurality of priority class signal frequencies in the combined-contention-signal includes determining whether the first station is the only station that has selected a priority class signal frequency with a highest frequency during the open-contention interval.

12. In a network system with a plurality of stations, the plurality of stations having a medium access control layer above a physical layer, a method of providing multiple priority classes with a medium-access-control-layer protocol connecting the stations to a transmission medium, the method comprising the following steps:

selecting on a first station a signal frequency for a highest priority class from N-number of priority classes to be used for contending stations, wherein the N-number of priority classes are created by partitioning a set of signal frequencies available for the physical layer into M-number of partitions, wherein each partition includes a contiguous range of signal frequencies from the set of signal frequencies and each frequency in the contiguous range of signal frequencies represents a priority class;

broadcasting the first signal frequency for the highest priority class in an intent-to-transmit-signal with a medium-access-control-layer protocol from the first station to other stations on the network during a medium access control protocol open-contention-interval;

receiving on the first station with the medium access control protocol a combined-contention-signal including a plurality of priority class intent-to-transmit-signals, wherein the combined contention signal is a superposition of a plurality of priority class intent-to-transmit-signals from others stations in the network system;

decoding a plurality of priority class intent-to-transmit-signal frequencies from the combined-contention-signal, wherein the plurality of priority class intent-to-transmit signal frequencies includes a plurality of signal frequencies for the highest priority class and a plurality of signal frequencies from selected ones of other priority classes;

determining whether the first station has selected the highest signal frequency for the highest priority class from a plurality of priority class signal frequencies in the combined-contention-signal for the highest priority class, and if so, transmitting data from the first station to the transmission medium as data for the highest priority class.

13. A computer readable medium having stored therein instructions for a causing a central processing unit on a station to execute the method of claim 12.

14. The method of claim 12 wherein the transmission medium is a coaxial cable.

15. The method of claim 12 wherein the highest priority class includes at least two signal frequencies.

* * * * *